(12) United States Patent
Hitchcock

(10) Patent No.: US 10,093,407 B2
(45) Date of Patent: Oct. 9, 2018

(54) ENHANCED WATER CAPTURE SYSTEMS FOR AIRCRAFT INTERIORS

(71) Applicant: The Boeing Company, Chicago, IL (US)

(72) Inventor: Cory M. Hitchcock, Granite Falls, WA (US)

(73) Assignee: The Boeing Company, Chicago, IL (US)

( * ) Notice: Subject to any disclaimer, the term of this patent is extended or adjusted under 35 U.S.C. 154(b) by 157 days.

(21) Appl. No.: 14/935,633

(22) Filed: Nov. 9, 2015

(65) Prior Publication Data

US 2017/0129582 A1  May 11, 2017

(51) Int. Cl.
*B64C 1/06* (2006.01)

(52) U.S. Cl.
CPC ................... *B64C 1/067* (2013.01)

(58) Field of Classification Search
CPC . B64C 1/066; B64C 1/067; Y10T 428/24273; Y10T 428/24281; Y10T 428/24289
USPC ............... 244/121, 129.1, 132, 133
See application file for complete search history.

(56) References Cited

U.S. PATENT DOCUMENTS

| 3,770,560 | A | * | 11/1973 | Elder | E01F 8/0076 |
| | | | | | 181/286 |
| 3,867,244 | A | * | 2/1975 | Adams | B64C 1/067 |
| | | | | | 236/44 R |
| 3,960,999 | A | * | 6/1976 | Massie | B29C 44/1209 |
| | | | | | 264/45.3 |
| 5,398,889 | A | * | 3/1995 | White | B64C 1/067 |
| | | | | | 244/119 |
| 6,383,623 | B1 | * | 5/2002 | Erb, Jr. | B64C 1/40 |
| | | | | | 428/220 |
| 6,720,069 | B1 | * | 4/2004 | Murakami | G10K 11/16 |
| | | | | | 428/131 |
| 2005/0004542 | A1 | * | 1/2005 | Bakkila | A47G 23/032 |
| | | | | | 604/367 |
| 2008/0302910 | A1 | * | 12/2008 | Calamvokis | B64C 1/067 |
| | | | | | 244/118.5 |
| 2013/0299630 | A1 | * | 11/2013 | Redecker | B64C 1/067 |
| | | | | | 244/1 N |
| 2014/0134389 | A1 | * | 5/2014 | Humfeldt | B64C 1/067 |
| | | | | | 428/99 |

OTHER PUBLICATIONS

Steven D. Villanueva & Keith Ardana, The Boeing Company, "Moisture-Fluid Control and Drainage Design Guide—777X D012W022-01," Rev New Jun. 2015, Figure 6.1-1: Example: Felt Strips on Stowage Bin Module.

* cited by examiner

*Primary Examiner* — Richard R Green
*Assistant Examiner* — Brady W Frazier
(74) *Attorney, Agent, or Firm* — Duft Bornsen & Fettig LLP

(57) ABSTRACT

Systems and methods are provided for enhanced water capture systems for aircraft interiors. One embodiment is a strip that is formed from a water-absorbent material for retaining moisture. The strip is adhered to an interior surface of an aircraft at a location proximate to an entry point for water into a cabin of the aircraft, and the strip comprises holes within the water-absorbent material that are staggered with respect to each other.

19 Claims, 7 Drawing Sheets

ENHANCED WATER CAPTURE SYSTEMS FOR AIRCRAFT INTERIORS

FIELD

The disclosure relates to the field of moisture control, and in particular, to moisture control for vehicles.

BACKGROUND

While an aircraft is in flight, moisture rises from the aircraft cabin and penetrates through insulation in the aircraft. The moisture then condenses out of the air and freezes to form ice crystals on the inside surface of the skin of the aircraft. When the aircraft lands, the skin of the aircraft is exposed to above-freezing temperatures, and the ice crystals can melt. The water drips off of the skin of the aircraft and onto insulation blankets. There are penetrations/holes in the insulation blankets. Hence, any water passing beyond the insulation can leak through these penetrations and drip onto the cabin interior, including for example near ceilings and stowage bins. If this water gets past the ceilings and stowage bins, it can drip into the passenger cabin or cargo area, which is undesirable.

SUMMARY

Embodiments described herein provide for enhanced moisture retention strips within aircraft. The strips are placed at locations in the aircraft where water would otherwise enter the cabin. These strips may therefore absorb and retain moisture that has already penetrated insulation and is leaking towards the aircraft's cabin. The strips include holes, and are thin enough to rapidly evaporate water via mass transfer as air passes over their surfaces. Furthermore, the enhanced strips are thin and wide in comparison to solid strips. This means that water traveling through the enhanced strips takes a longer path than it would in solid strips.

One embodiment is a strip that is formed from a water-absorbent material for retaining moisture. The strip is adhered to an interior surface of an aircraft at a location proximate to an entry point for water into a cabin of the aircraft, and the strip comprises holes within the water-absorbent material that are staggered with respect to each other.

Another embodiment is an aircraft. The aircraft includes a cabin with a ceiling, a floor, and side walls. The aircraft also includes a plurality of strips that are formed from a water-absorbent material for retaining moisture. Each strip is adhered to an interior surface of an aircraft at a location proximate to an entry point for water into a cabin of the aircraft. Furthermore, each strip comprises multiple holes within the water-absorbent material that are staggered with respect to each other.

Yet another embodiment is method. The method includes drawing leaking water from an aircraft into a strip formed from a water-absorbent material for retaining moisture. The method also includes wicking the water through the water-absorbent material around holes in the water-absorbent material such that water traveling within the material changes direction multiple times as it traverses the material, and removing water trapped in the strip via evaporation.

Other exemplary embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
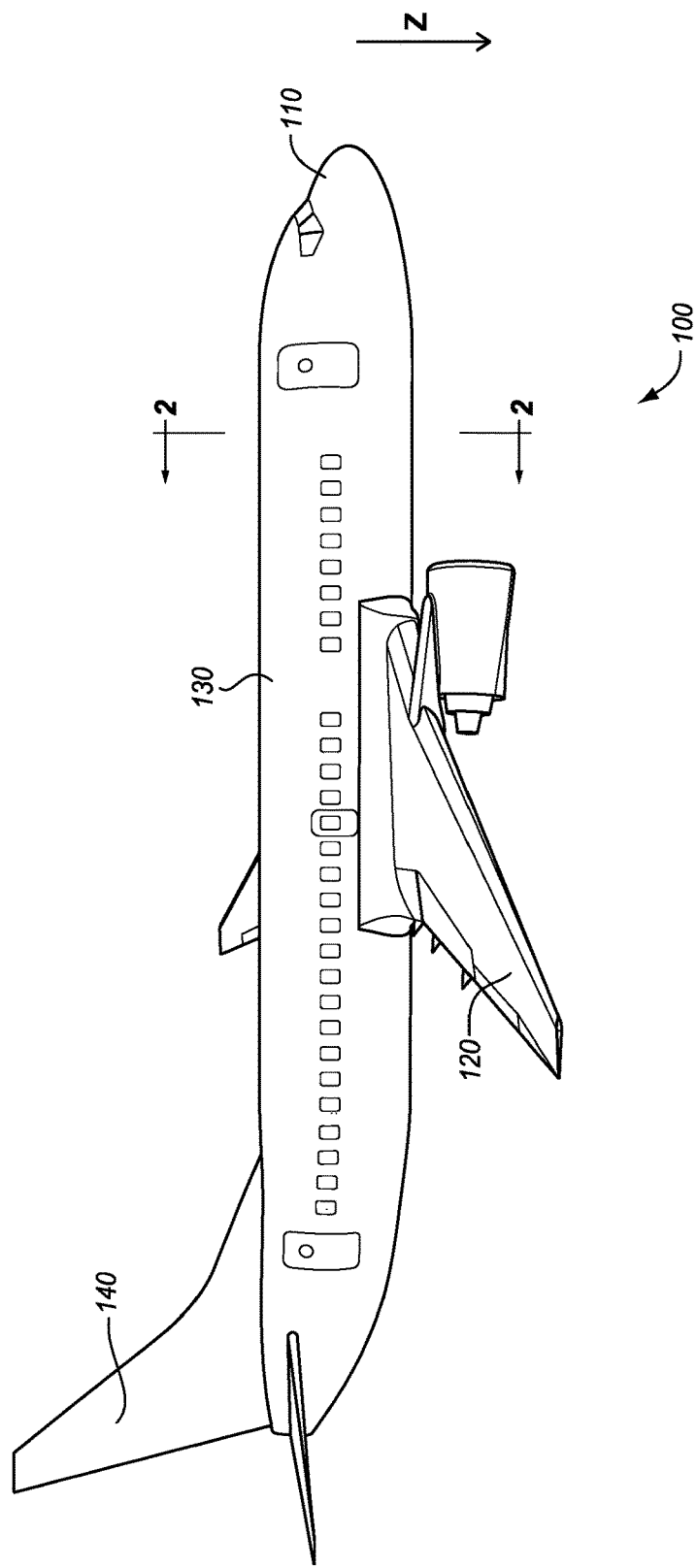
FIG. 1 is a block diagram of an aircraft in an exemplary embodiment.
Figure 2:
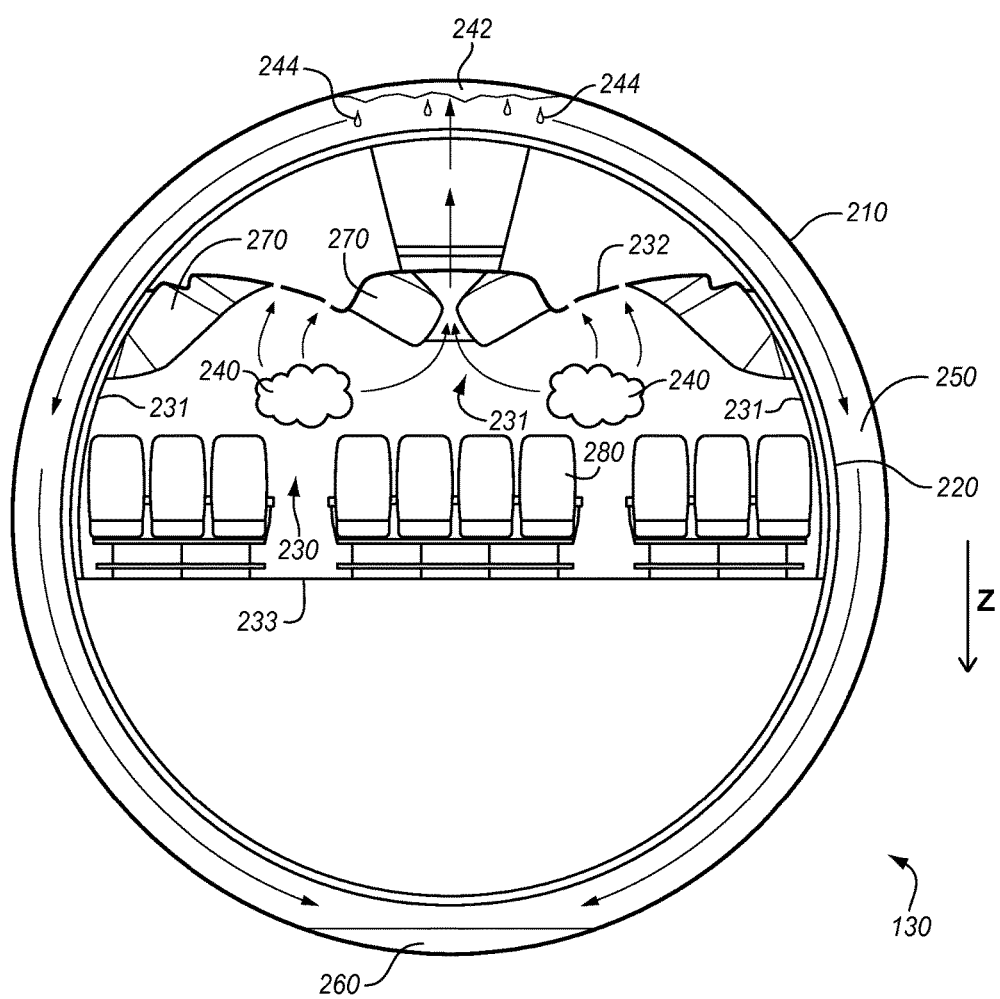
FIG. 2 is a cross-section view of an aircraft in an exemplary embodiment.
Figure 3:
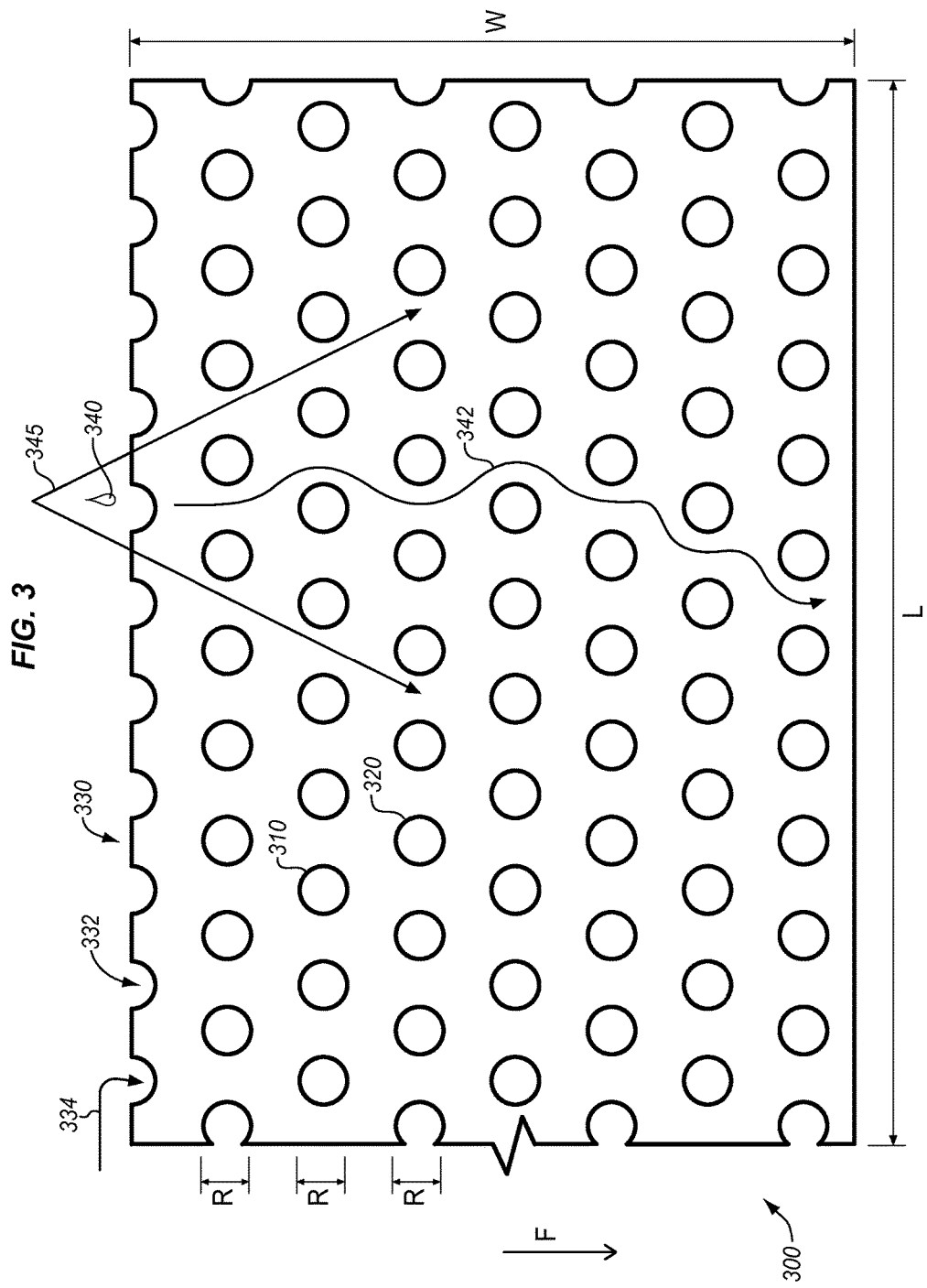
FIG. 3 is a diagram of an enhanced moisture retention strip in an exemplary embodiment.
Figure 4:
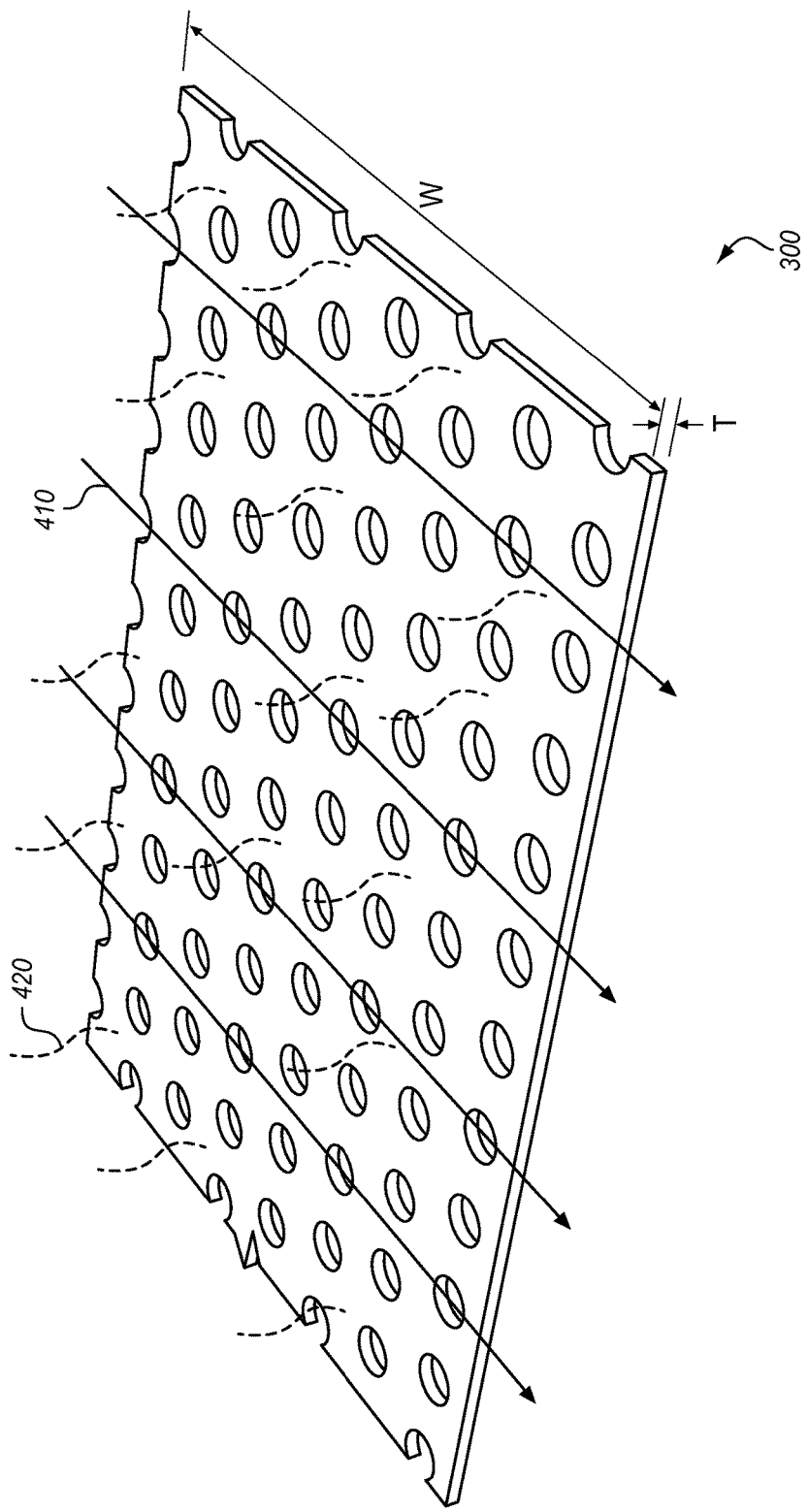
FIG. 4 is a diagram of evaporation of moisture from a moisture retention strip in an exemplary embodiment.

FIGS. 1-2 illustrate moisture flow in an exemplary aircraft, while FIGS. 3-4 illustrate enhanced moisture retention strips that absorb moisture which would otherwise enter a cabin of the aircraft through leaks in insulation. FIG. 1 is a diagram of an aircraft 100 in an exemplary embodiment. FIG. 1 shows that aircraft 100 includes nose 110, wings 120, fuselage 130, and tail 140. FIG. 1 also illustrates a downward arrow (Z) indicating the expected direction in which the force of gravity will pull objects, such as liquid water, onboard aircraft 100.

FIG. 2 is a cross-section view of aircraft 100 indicated by view arrows 2 in FIG. 1. FIG. 2 illustrates a circular portion of aircraft fuselage 130. Fuselage 130 includes floor 233, ceiling 232, and sidewalls 231, which define cabin 230. Passengers in aircraft 100 may congregate in seats 280 of cabin 230 during flight. FIG. 2 illustrates that inside of fuselage 130 (e.g., in cabin 230), respiration and other sources of water cause moisture 240 to enter the air in cabin 230. For example, warm exhaled air includes moisture 240 and rises upward through luggage compartments 270. Some of this warm and moist air rises through ceiling 232. Furthermore, some warm air continues to rise upward through insulation 220 into a space 250 between insulation 220 and aircraft skin 210. Merely by way of example, the respiration of a group of four hundred passengers on a fourteen hour flight can release almost eighty four gallons of moisture into an aircraft cabin. This is a substantial amount of moisture to account for at aircraft 100.

Skin 210 is cooled by the outside air at high altitude, and therefore has a temperature that is below freezing. This causes water to condense out of the air and freeze onto skin 210 as ice 242. Ice 242 melts into water droplets 244 upon descending to a lower altitude (e.g., for landing). This causes water droplets 244 to travel through space 250 into drainage channel 260. Some water droplets 244 enter gaps in insulation 220 and drip onto passengers. The size of space 250 has been substantially exaggerated in FIG. 2 in order to highlight the path through which droplets 244 are intended to travel.

FIG. 3 is a diagram of an enhanced moisture retention strip 300 in an exemplary embodiment. Strip 300 comprises any component operable to absorb and/or dam liquid water traveling through an aircraft. In this embodiment, strip 300 is formed of a water-absorbent material such as BMS8-242 Aramid felt. Strip 300 includes multiple holes/cut-out sections (310, 320). These holes (310, 320) enhance the utility of strip 300 because their staggered configuration with respect to an expected flow direction (F) of liquid water ensures that a water droplet 340 will travel a "tortured" and indirect path (e.g., path 342) through strip 300. Since the water will travel a longer (and substantially random) path along strip 300, the water-absorbent material from strip 300 is more efficiently used than in solid configurations. For larger leaks, a stream of water traveling downward through strip 300 is likely to spread out in wedge/cone shape 345. This means that water from a single leak entering strip 300 at a known location (e.g., as shown by drop 340) is more likely to be absorbed by strip 300 when compared to solid moisture retention strips that water would travel directly through in a vertical direction. Since water from a leak is more likely to be absorbed by strip 300, there is less of a chance that leaking water will reach an aircraft cabin by traveling through strip 300.

In this embodiment, strip 300 has a variable length (L) (depending on what structural component of aircraft 100 is being protected by strip 300) and a width (W) of approximately three inches. Holes 310 and 320 are arranged into rows (R), and the holes in neighboring rows are staggered with respect to each other. In a further embodiment, the holes of a row laterally overlap the holes of an adjacent row (e.g., along the lengthwise direction L shown in FIG. 3). In still further embodiments, holes 310 and 320 may comprise any suitable shapes. For example holes 310 and/or 320 and may comprise varying shapes (e.g., shapes that differ depending upon row). Hole shapes may for example be chosen to as to increase water retention, or to increase the amount of "spread" encountered by a leak when it travels through strip 300. In one embodiment, the holes occupy approximately 40-60% of the volume of strip 300 (e.g., 50%).

Strip 300 also exhibits a notched upper surface 330, comprising multiple notches 332 that interrupt the flow of water that would otherwise skim along the top of strip 300 and then travel down along a side of strip 300. This feature is particularly beneficial in interrupting water flow and ensuring that water is drawn into strip 300 instead of traveling around strip 300. Water is well-known for exhibiting strong adhesion and cohesion. Notches 332 provide physical obstacles that interrupt flowing water to prevent the water from bypassing strip 300. This is particularly useful because if strip 300 is not placed perfectly horizontally, or if aircraft 100 changes its orientation during flight, water will still become trapped in strip 300 when its flow across the upper surface 330 is interrupted by notches 332, as shown in element 334.

FIG. 4 is a diagram of evaporation of moisture from a moisture retention strip 300 in an exemplary embodiment. Strip 300 has a thickness of T (e.g., 1/10 of an inch). Since strip 300 includes multiple holes and is substantially planar, strip 300 may be fabricated wider than a solid moisture retention strip without increasing weight. This is substantially beneficial in aerospace environments where weight reduction is important. FIG. 4 illustrates that as dry air travels across strip 300 (e.g., along path 410), water retained/absorbed by strip 300 is drawn into the air by evaporative processes as shown by element 420. Since strip 300 exhibits a larger surface area per unit volume than a solid moisture retention strip, its rate of evaporation is substantially higher. This in turn means that strip 300 is more likely to dry between flights for aircraft 100. Hence, strip 300 is therefore less vulnerable to cycling problems where moisture accumulates and eventually saturates a strip as flights continue throughout the day.

An operating technician may install strip 300 in locations where moisture is expected to enter cabin 230 of aircraft 100, such as a luggage compartment or ceiling panel. Any potential entry point for water into cabin 230 may be a suitable location to install strip 300. Strip 300 may be installed by applying a waterproof glue onto a structural component of aircraft 100 and then affixing strip 300 thereto.

Figure 5:
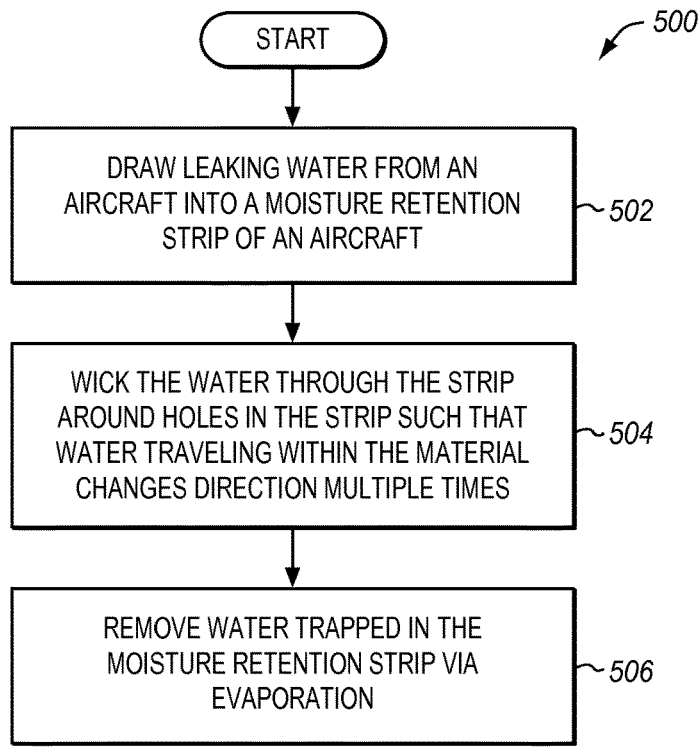
FIG. 5 is a flowchart illustrating a method for capturing moisture in an exemplary embodiment.

Illustrative details for methods relating to strip 300 will be discussed with regard to FIGS. 5-6. FIG. 5 is a flowchart illustrating a method capturing moisture in an exemplary embodiment. The steps of method 500 are described with reference to strip 300 of FIG. 3 and aircraft 100 of FIG. 1, but those skilled in the art will appreciate that method 500 may be performed in other suitable environments. The steps of the flowcharts described herein are not all inclusive and may include other steps not shown. The steps described herein may also be performed in an alternative order. Leaking water traveling along any surface of strip 300 is drawn from aircraft 100 into strip 300 (e.g., by capillary action drawing the water from upper surface 330 into strip 300) (step 502). The water is wicked through strip 300 around holes (310, 320) such that water traveling within strip 300 changes direction multiple times (e.g., as capillary action draws the water through the material). That is, the water traverses around holes 310 and 320 instead of into holes 310 and 320 (step 504). Once the water is trapped in strip 300, airflow over strip 300 causes evaporative processes that remove water from strip 300. Hence, using this improved technique, water is trapped and evaporated efficiently.

Figure 6:
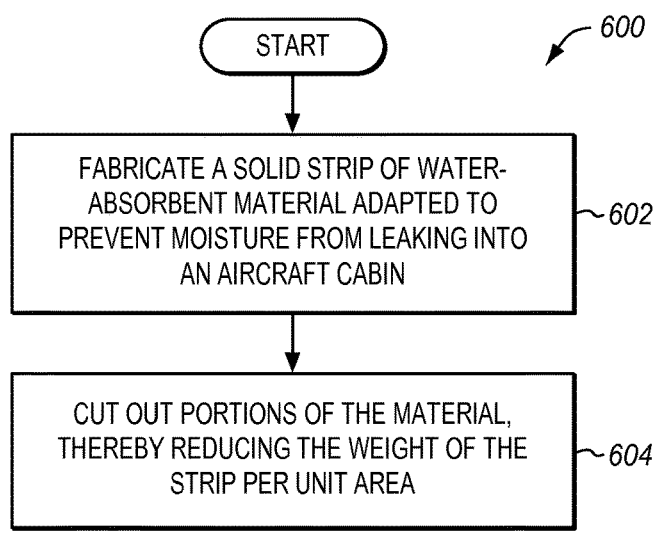
FIG. 6 is a flowchart illustrating a method for fabricating an enhanced moisture retention strip in an exemplary embodiment.

FIG. 6 is a flowchart illustrating a method for fabricating an enhanced moisture retention strip in an exemplary embodiment. In step 602, a solid strip of water-absorbent material is fabricated. The strip may be fabricated by the operation of cutting machinery that cuts the strip from a large roll of material, such as Aramid felt (e.g., BMS8-242). In step 604, portions of the material are cut out to form holes, thereby reducing the weight of the strip per unit area. Step 604 may be achieved by use of an automated hole punch, stamp, or similar device.

Figure 7:
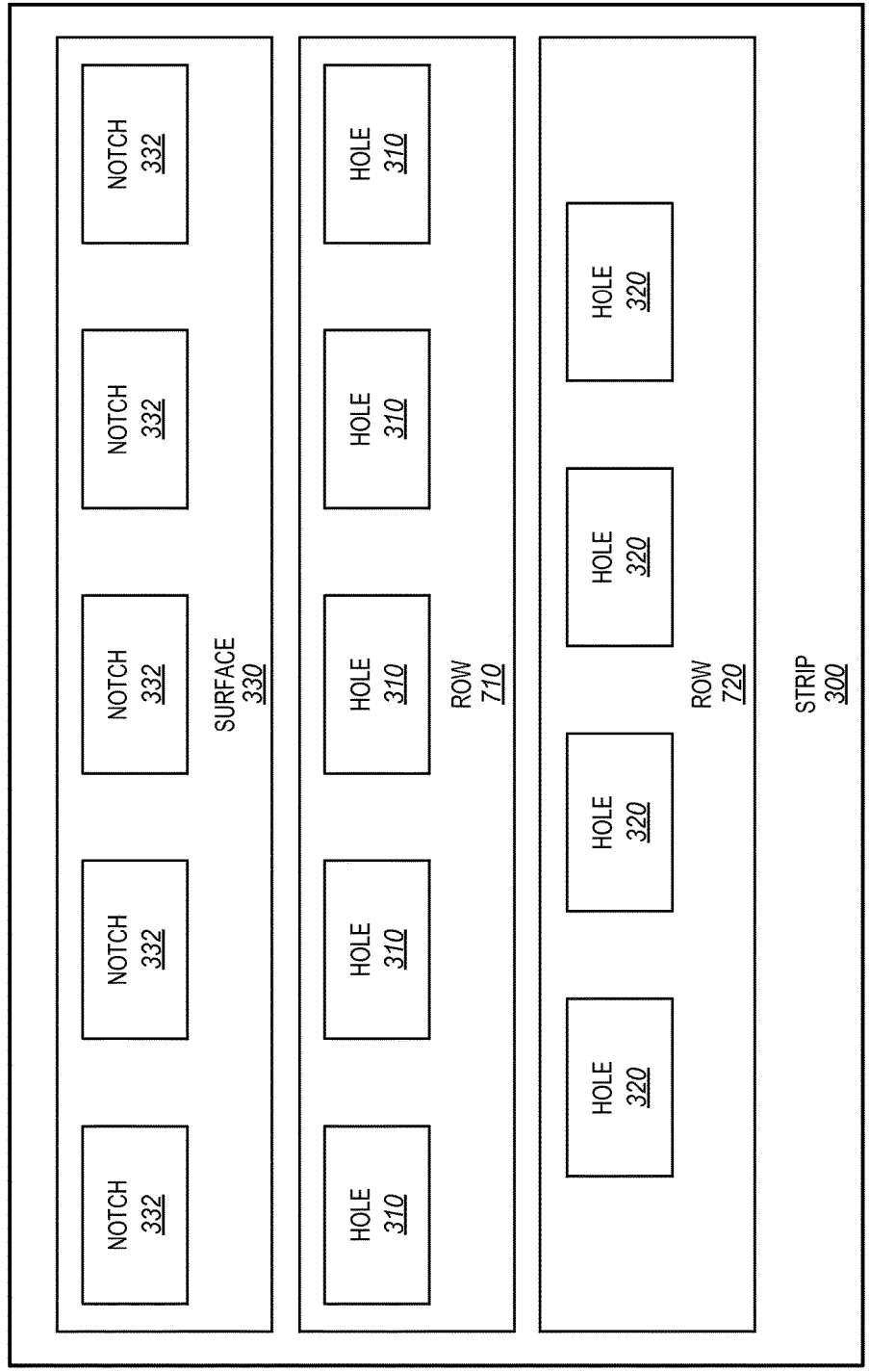
FIG. 7 is a block diagram illustrating an enhanced moisture retention strip in an exemplary embodiment.

FIG. 7 is a block diagram illustrating an enhanced moisture retention strip 300 in an exemplary embodiment. Specifically, FIG. 7 illustrates, in block diagram form, that strip 300 includes an arrangement of rows 710 and 720, capped by surface 330. Surface 330 includes notches 332, row 710 includes holes 310, and row 720 includes holes 320, which are staggered with regard to holes 310 of row 710.

Figure 8:
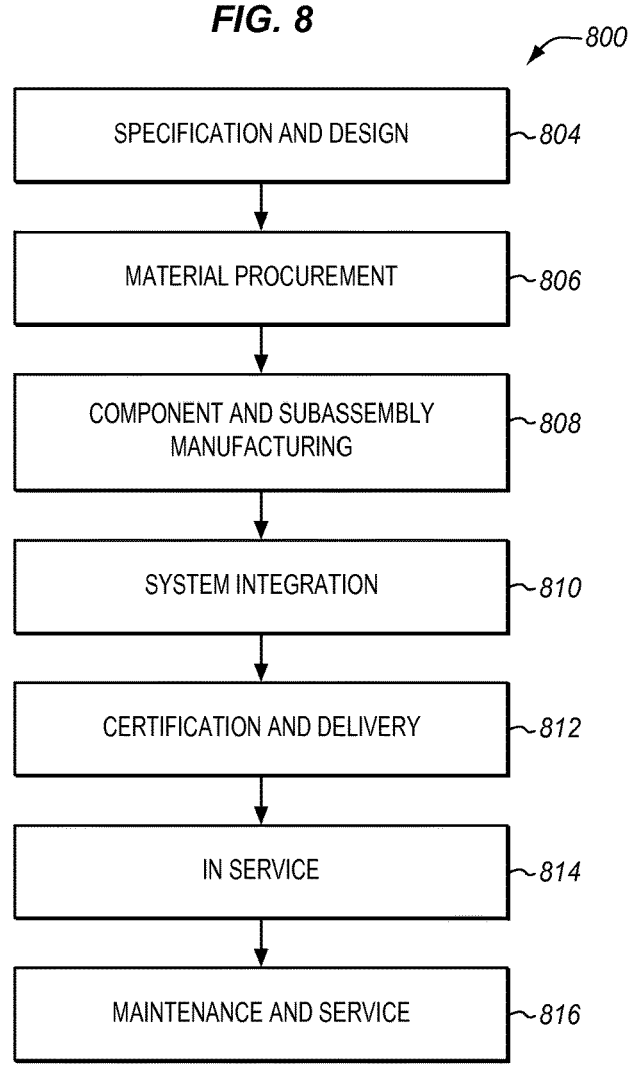
FIG. 8 is a flow diagram of aircraft production and service methodology in an exemplary embodiment.
Figure 9:
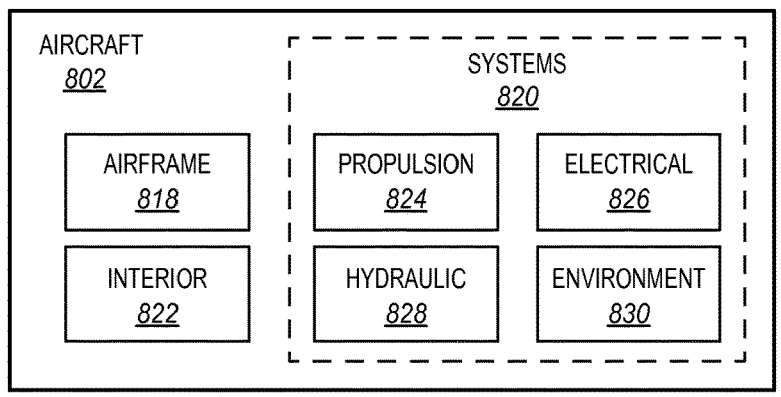
FIG. 9 is a block diagram of an aircraft in an exemplary embodiment.

Referring more particularly to the drawings, embodiments of the disclosure may be described in the context of an aircraft manufacturing and service method 800 as shown in FIG. 8 and an aircraft 802 as shown in FIG. 9. During pre-production, exemplary method 800 may include specification and design 804 of the aircraft 802 and material procurement 806. During production, component and subassembly manufacturing 808 and system integration 810 of the aircraft 802 takes place. The aircraft 802 may further go through certification and delivery 812 in order to be placed in service 814. While in service by a customer, the aircraft 802 is scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 9, the aircraft 802 produced by exemplary method 800 may include an airframe 818 with a plurality of systems 820 and an interior 822. Examples of high-level systems 820 include one or more of a propulsion system 824, an electrical system 826, a hydraulic system 826, and an environmental system 830. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production stage 808 may be fabricated or manufactured in a manner similar to components or subassemblies produced while the aircraft 802 is in service. Also, one or more apparatus embodiments, method embodiments, or a combination thereof may be utilized during the production stages 808 and 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816.

In one embodiment, strip 300 is assembled during material procurement 806, and is applied to aircraft 100 during system integration 810. Strip 300 may then be utilized in service 814 until wear renders strip 300 unusable. Then, in maintenance and service 816, strip 300 may be discarded and replaced with a newly manufactured strip 300.

Any of the various computer-controlled elements or pieces of machinery (e.g., punches, robot arms, etc.) shown in the figures or described herein may be controlled by systems implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

The invention claimed is:

1. An apparatus comprising:
a strip that is formed from a water-absorbent material for retaining moisture,
the strip is adhered along its length and width to an interior surface of an aircraft at a location proximate to an entry point for water into a cabin of the aircraft, and is configured to draw liquid water to flow through the plane of the strip, and
the strip comprises holes within the water-absorbent material that are staggered within the plane of the strip.

2. The apparatus of claim 1 wherein:
the holes are staggered such that water entering the strip at an upper surface of the strip and traveling downward wicks laterally around the holes in an expanding wedge-shaped pattern, and such that water traveling within the material changes direction multiple times as it traverses the material.

3. The apparatus of claim 1 wherein:
the holes are grouped into rows, and the holes of a row are staggered with respect to the holes of an adjacent row.

4. The apparatus of claim 1 wherein:
the holes are grouped into rows, and the holes of a row laterally overlap the holes of an adjacent row.

5. The apparatus of claim 1 further comprising:
a notched upper edge that draws water into the water-absorbent material, and interferes with flow of water along the upper edge.

6. The apparatus of claim 1 wherein:
the holes have a circular cross section.

7. The apparatus of claim 1 wherein:
the strip is adhered along its length and width to a surface that is inboard of insulation at the aircraft and proximate to a luggage storage compartment of the aircraft or a ceiling panel of the aircraft.

8. The apparatus of claim 1 wherein:
the strip is adhered to a luggage storage compartment of the aircraft or a ceiling compartment of the aircraft.

9. The apparatus of claim 1 wherein:
the strip utilizes capillary action to draw the water into the strip and retain the water in the strip.

10. The apparatus of claim 1 wherein:
the water-absorbent material comprises Aramid felt.

11. The apparatus of claim 1 wherein:
the holes extend completely through a thickness of the strip, and a ratio of volume of the holes to volume of the water-absorbent material is between 4:6 and 6:4.

12. The apparatus of claim 1 wherein:
the volume of the holes is equal to or greater than the volume of the water-absorbent material within the strip.

13. The apparatus of claim 1 wherein:
the strip is less than one half inch thick, and more than one inch long.

14. An aircraft comprising:
a cabin comprising a ceiling, a floor, and side walls; and
a plurality of strips that are formed from a water-absorbent material for retaining moisture,
each strip is adhered along its length and width to an interior surface of an aircraft at a location proximate to an entry point for water into a cabin of the aircraft, and is configured to draw liquid water to flow through the plane of the strip, and
each strip comprises multiple holes within the water-absorbent material that are staggered within the plane of the strip.

15. The aircraft of claim 14 wherein:
the holes are staggered for a strip such that water entering the strip at an upper surface of the strip and traveling downward wicks laterally around the holes in an expanding wedge-shaped pattern, and such that water traveling within the material changes direction multiple times as it traverses the material.

16. The aircraft of claim 14 wherein:
the holes are grouped into rows, and the holes of a row are staggered with respect to the holes of an adjacent row.

17. The aircraft of claim 14 wherein:
the holes are grouped into rows, and the holes of a row laterally overlap the holes of an adjacent row.

18. The aircraft of claim 14 wherein the strips each further comprise:
a notched upper edge that draws water into the water-absorbent material, and interferes with flow of water along the upper edge.

19. The aircraft of claim 14 wherein:
the holes extend completely through a thickness of the strip, and a ratio of volume of the holes to volume of the water-absorbent material is between 4:6 and 6:4.

* * * * *